(12) United States Patent
Ng

(10) Patent No.: US 11,272,757 B2
(45) Date of Patent: Mar. 15, 2022

(54) PROCESS FOR MAKING A SHOE AND SHOE THUS MADE

(71) Applicant: Ying Yuk Ng, Kowloon (HK)

(72) Inventor: Ying Yuk Ng, Kowloon (HK)

( * ) Notice: Subject to any disclaimer, the term of this patent is extended or adjusted under 35 U.S.C. 154(b) by 607 days.

(21) Appl. No.: 16/002,427

(22) Filed: Jun. 7, 2018

(65) Prior Publication Data

US 2018/0352899 A1 Dec. 13, 2018

Related U.S. Application Data

(60) Provisional application No. 62/516,877, filed on Jun. 8, 2017.

(51) Int. Cl.
| | |
|---|---|
| *A43B 9/12* | (2006.01) |
| *A43B 1/14* | (2006.01) |
| *A43B 9/02* | (2006.01) |
| *A43B 1/00* | (2006.01) |
| *B29D 35/06* | (2010.01) |
| *A43B 13/16* | (2006.01) |
| *A43B 13/02* | (2022.01) |
| *D04H 1/08* | (2012.01) |

(52) U.S. Cl.
CPC .............. *A43B 9/12* (2013.01); *A43B 1/0063* (2013.01); *A43B 1/14* (2013.01); *A43B 9/02* (2013.01); *A43B 13/02* (2013.01); *A43B 13/16* (2013.01); *B29D 35/065* (2013.01); *D04H 1/08* (2013.01); *D10B 2401/041* (2013.01); *D10B 2501/043* (2013.01)

(58) Field of Classification Search
CPC ..... A43B 23/0295; A43B 13/023; A43B 9/20; B29D 35/065; D04H 1/08; B29C 65/00
USPC .......................................................... 156/242
See application file for complete search history.

(56) References Cited

U.S. PATENT DOCUMENTS

| | | | | |
|---|---|---|---|---|
| 6,952,910 | B1* | 10/2005 | Lorsch | B29C 66/8322 |
| | | | | 53/472 |
| 2011/0078922 | A1* | 4/2011 | Cavaliere | A43B 23/025 |
| | | | | 36/54 |
| 2015/0289595 | A1* | 10/2015 | Rushbrook | A43C 1/00 |
| | | | | 36/50.1 |
| 2018/0368521 | A1* | 12/2018 | Choi | B29D 35/085 |

OTHER PUBLICATIONS

English Translation of Li (CN10369259) (Year: 2014).*
English Translation of Wu (CN 203207295) (Year: 2013).*

* cited by examiner

*Primary Examiner* — Matthew J Daniels
*Assistant Examiner* — Hana C Page
(74) *Attorney, Agent, or Firm* — WPAT, PC

(57) ABSTRACT

Disclosed herein is a process for making a shoe using a stand-alone mouldable nonwoven fabric which has the ability of self-sustaining and shape maintenance and which is heated to become softened till molten. In the process of the invention, the shoe parts are moulded by a compression moulding process and the moulded parts are then heated and welded together by a plastic welding method.

7 Claims, 7 Drawing Sheets

PROCESS FOR MAKING A SHOE AND SHOE THUS MADE

FIELD OF THE INVENTION

The present invention relates to a process for making a shoe, and shoe thus made. Particularly, the present invention relates to a process for making a shoe using a stand-alone mouldable nonwoven fabric without the need of using any adhesive and with reduced intervention of manpower.

BACKGROUND OF THE INVENTION

To date, several processes are known and used for making shoes. For example, a conventional method is called a "gluing method" which consists in the steps of separately preparing individual shoe parts including a shoe upper, a midsole and an outsole, and subsequently attaching the individual shoe parts one to another by gluing. That is, the gluing method is carried out discontinuously, on the basis of separately prepared shoe parts by known techniques.

The gluing may be achieved by adhesive substances such as styrene butadiene rubber (SBR), neoprene, polyurethane, thermoplastic-resin. Among other things, SBR is the most popular adhesive used for making shoes. However, SBR is known in the art to be quite hazardous to the operators' health, and when the used shoes are discarded, they may represent a source of environmental pollution due to the difficulty of disposal thereof.

The shoe upper comprises an opening configured to receive a wearer's foot and is generally constructed of one or more types of materials such as leather, synthetic leather, wood, plastic, polymer, composites, natural materials, synthetic materials, other materials and/or combinations thereof. The midsole is preferably made of a low density (foamed) and soft material for ensuring lightness, flexibility and comfort to the shoe, while the outsole is generally constructed of a synthetic material with different mechanical and chemical-physical features, compared to that of the midsole, and preferably made of a high density material having characteristics of compact, wear resistant, non-slip, non-oil and/or with antistatic features because it is in constant contact with the ground.

Obviously, the materials useful for preparing the shoe upper, the midsole and the outsole are different. After these three shoe parts are separately prepared, the outsole is glued onto the midsole and the shoe upper according to the gluing method at least at their contact edges.

In particular, the attachment of the shoe parts by adhesive provides for a first step of spreading the adhesive on the shoe parts to be glued, and a subsequent step of drying the adhesive for the purpose of getting perfect adherence of the adhesive to the shoe parts on which it has been spread and at the same time to prevent the adhesive in the liquid state to cause unwanted gluing of the shoe parts not perfectly aligned or not complementary to each other, during the transport of the same glued parts. At the end of the drying step, the glue spread on the shoe parts is not active and requires to be reactivated thermally before the shoe parts are mutually joined together.

Therefore, preparing a shoe according to such gluing method is time-consuming, labour-intensive and complex, because the method comprises several operations to be performed on the shoe parts (e.g. shoe upper and outsole) to be coupled by gluing to each other. The operation steps include, before being glued to the shoe upper, the outsole must be washed to remove any residues of material used to prepare the outsole, treated with suitable solvents intended for facilitating the gluing thereof, and then spread with glue by painting. These operations are generally carried out manually and require a quite long period of time. Apart from this, the time needed for drying the glues applied, as well as the time spent for topping up the glue at the contact edges between the shoe upper and the outsole are significant. Similarly, an operation is also performed on the shoe upper.

Obviously, the gluing method involves the use of many machines and equipment and it is difficult to allow for automation, thus requiring specialised labour.

SUMMARY OF THE INVENTION

The object of the present invention is to obviate at least a part of the drawbacks mentioned hereinabove.

To address the drawbacks, there is a need for the provision of a novel process for making a shoe which is less labour-intensive, more economically advantageous, and leads to a reduction in the production time.

Another object of the invention is to provide a process for making a shoe which eliminates the attachment of various shoe parts by gluing, with increased eco-friendly features and causing no harm to the operators.

A further object of the invention is to provide a process for making a shoe with a mouldable material, especially a stand-alone mouldable nonwoven fabric, which is quick, inexpensive and highly automated.

The present invention has been developed to fulfill the needs noted above.

A first aspect of the invention is to provide a process for making a shoe including a shoe upper, a midsole and an outsole, the shoe upper comprising an upper body having an opening configured to receive a wearer's foot, and a lower edge extending perimetrically from the upper body, the process comprising the steps of:

i) providing separately the shoe upper, the midsole and the outsole, wherein the midsole and the outsole are respectively moulded as one piece from a stand-alone mouldable nonwoven fabric which has the ability of self-sustaining and shape maintenance and which is heated to become softened till molten;

ii) attaching the lower edge of the shoe upper to the midsole; and iii) heating at least a part of the midsole and at least a part of the outsole to an extent that allows for welding said heated parts of the midsole and the outsole so as to attach the midsole to the outsole.

In one exemplary embodiment of the process for making a shoe according to the invention, the shoe upper is provided by moulding two separate symmetrical halves as one piece from the stand-alone mouldable nonwoven fabric, respectively; heating the two symmetrical moulded halves at their respective marginal portions along a longitudinal direction of the shoe upper to an extent that allows for welding said heated marginal portions of the two halves so as to attach the two halves at the marginal portions thereof in a manner that the two symmetrical halves form together the shoe upper. Preferably, the lower edge of the shoe upper and the midsole are heated and welded so that they are attached to each other. For example, the lower edge of the shoe upper and the midsole in contact with each other are heated to an extent that the respective contacting edges become softened or molten, and the softened or molten edges are welded to allow for attachment of the shoe upper and the midsole at the edges thereof In a preferred embodiment of the process for making a shoe according to the invention, the midsole and the outsole are heated and welded over their entire surfaces in step iii). For example, a whole surface of the midsole and a whole surface of the outsole are heated to become soft enough to enable for welding thereof, such that the shoe upper, the midsole and the outsole are welded together.

In one embodiment of the process for making a shoe according to the invention, moulding of the stand-alone mouldable nonwoven fabric is carried out in a compression moulding process.

In one embodiment of the process for making a shoe according to the invention, welding of the shoe parts comprises plastic welding. Common plastic welding methods known in the art can be utilized for the process of the invention. Preferably, the plastic welding is selected from a group consisting of hot plate welding, infrared welding, flame welding, and ultrasonic welding.

In a further embodiment of the process for making a shoe according to the invention, the moulded shoe parts are welded by heating at portions to be attached to an extent that the heated portions become softened or molten and attaching the heated portions. Preferably, the plastic welding is controlled so that different degrees of welding hardness can be obtained at different welding sites upon utilizing an appropriate welding method.

Advantageously, the stand-alone mouldable nonwoven fabric used in the process of the invention is a type of nonwoven needle punch felt fabric. Preferably, the stand-alone mouldable nonwoven fabric has the ability of self-sustaining and shape maintenance, and is capable of persistently retaining a desired shape under an external pressure after the nonwoven needle-punch fabric is molded into said shape without any support.

For example, the nonwoven fabrics disclosed in the international applications under PCT/CN2011/071371 and PCT/CN2011/084323 filed by the same applicant may be used in the invention. The contents of each of the above-mentioned patent applications are hereby incorporated by reference herein in their entirety and made as a part of this specification.

Alternatively, in another embodiment of the process for making a shoe according to the invention, the shoe comprises shoe parts made from stitchable materials which may not be characterized by mouldability as discussed above. Common stitchable materials useful in shoe making can be utilized in the process of the invention, which include leather, satin, suede, canvas, and breathable mesh fabric. For example, the upper body of the shoe upper can be cut as a single piece or many upper parts like tongue, vamp, toe puff, toe cap, quarter, lining are pre-made and then stitched together according to a conventional method known in the art.

In an exemplary embodiment of the process for making a shoe according to the invention, the shoe upper is made of one or more stitchable materials, and the lower edge of the shoe upper and the midsole are stitched together so as to be attached to each other. The midsole is then heated and welded to the outsole as described above.

In a further exemplary embodiment of the process for making a shoe according to the invention, the upper body of the shoe upper is made of one or more stitchable materials, the lower edge of the shoe upper is made of the stand-alone mouldable nonwoven fabric, the upper body is stitched to the lower edge to form the shoe upper, and the lower edge and the midsole are heated and welded so that they are attached to each other. More specifically, the lower edge of the shoe upper is moulded from the stand-alone mouldable nonwoven fabric in one piece, or in two or more pieces and heated and welded together. The upper body prepared using the stitchable materials and the moulded lower edge is stitched together to be ready for attachment to the midsole by plastic welding as described in above embodiments.

Optionally, the process for making a shoe according to the invention may further comprises a step of moulding an insole as one piece from the stand-alone mouldable nonwoven fabric and arranging the insole to be fixedly or removably attached to the shoe upper. Particularly, the insole and the midsole are heated and welded together. The insole is provided for the purpose of shock absorption, for example.

A second aspect of the invention is to provide a shoe made according to the process for making a shoe of the invention.

According to the invention, the shoe may be selected from a group consisting of sneakers, sports shoes, galoshes, high heels, Stiletto heels, kitten heels, lace-up shoes, high-Tops, loafers, slippers, platform shoes, school shoes and many others.

BRIEF DESCRIPTION OF THE DRAWINGS

In the following detailed description, reference is made to the accompanying drawings. In the drawings, like reference numbers represent like parts throughout the various views. Dimensions in the drawings may be exaggerated and not in scale for the convenience of description.

DETAILED DESCRIPTION OF EMBODIMENTS

Figure 1:
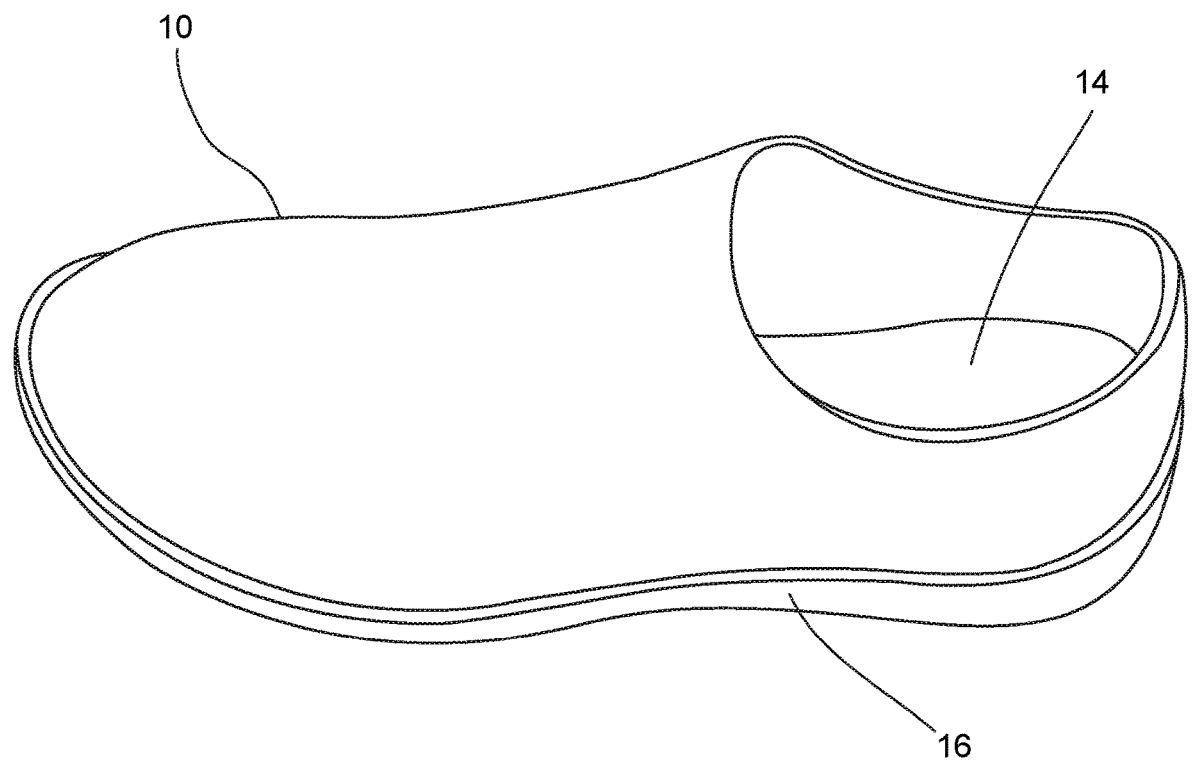
FIG. 1 is a perspective view from the top of a shoe made according to an embodiment of the invention, illustrating a shoe upper, a midsole, and an outsole.

The present invention is achieved, in part, by utilizing the stand-alone mouldable nonwoven fabric, such as those disclosed in PCT/CN2011/071371 and PCT/CN2011/084323 filed by the same applicant. The nonwoven felt fabrics taught by these two co-pending applications have excellent hardness and stiffness, remarkable moldability, and high compressive strength, therefore are suitable for the invention.

The international application under PCT/CN2011/071371 discloses a nonwoven needle-punch felt fabric and a method for producing the fabric. The nonwoven fabric is made of at least one low-melting-point short fiber and at least one high-melting-point short fiber, characterized in that the low-melting-point fiber is a solidifiable material, particularly is capable of solidifying after it is heated to melt, whereby the obtained felt fabric has the ability of self-sustaining and shape maintenance. The felt fabric disclosed in this patent application can also be moulded into various shapes according to the actual needs and has a characteristic of being persistently retaining in those shapes after it is moulded. Therefore, the fabric exhibits excellent hardness and stiffness, remarkable moldability, and high compressive strength.

Another international application under PCT/CN2011/084323 discloses a novel nonwoven needle punch felt fabric and a method for producing the fabric. This nonwoven fabric is made of one short fiber of same type, or two or more types of short fiber which have a substantially same melting point, characterized in that about 30% to 80% of the short fiber is heated to melt and then solidifies so as to form a single melting point nonwoven fabric. It was tested that the single melting point nonwoven fabric obtained as such is also stiff to have the ability of self-sustaining and shape maintenance, and exhibits excellent hardness and stiffness, remarkable moldability, and high compressive strength as well.

In light of the unique characteristics of the non-woven fabric discussed above, especially the self-sustaining and shape maintenance, remarkable moldability, the above-mentioned two non-woven fabrics are suitable for use in the process for making a shoe of the invention.

The invention is based on the above characteristics of the standalone non-woven fabric to provide a method for making a shoe, in which one or more shoe parts are moulded as one piece from the nonwoven fabric which is stiff enough to be self-sustaining, has a high wear resistance and the ability of withstanding the impact from the ground. The capability of being heated to become soft or even molten enables the use of welding the nonwoven fabric together. Therefore, in the process for making a shoe according to the invention, it makes possible to use a welding method for welding the shoe parts. The welding step of attaching the shoe parts together may be implemented by plastic welding methods known in the art which are based on the mechanism of heat generation at the welding interface. The plastic welding methods are a process of welding for softened surfaces of semi-finished plastic materials, usually with the aid of heat, and comprise generally three sequential stages, namely surface preparation, application of heat and pressure, and cooling. Numerous plastic welding methods have been developed and may be applied in the method of the invention. Preferably, the plastic welding method is selected from a group consisting of hot plate welding method, infrared welding method, flame welding method, and ultrasonic welding method.

Preferably, different shoe parts may be moulded from the standalone nonwoven fabric materials have different gram weights and different shore A hardness, and different degrees of welding hardness may be applied to different shoe parts. A nonwoven fabric of relatively low gram weight and hardness may be employed to make the shoe upper in order to provide the softness and comfort feel, while a nonwoven fabric of relatively high gram weight and hardness may be employed to make the outsole which requires high resistance to wear and impact and high compressive strength. More preferably, welding of shoe parts may be performed non-uniformly around the welding sites. For the purpose of improving comfort, for example, welding at the toe side of the shoe is carried out at a lower temperature or a shorter compression duration so as to obtain a softer welding hardness at the toe side where flexibility is preferred. Similarly, welding at the heel side of the shoe is carried out at a higher temperature or a longer compression duration so as to obtain a harder welding hardness at the heel side where hardness and support is preferred. There are other means for varying the welding hardness, such as changing welding area ratio or welding pattern between the shoe parts.

In the hot plate welding method, two contact edges of the two fabrics to be welded will be placed on two opposite sides of the hot plate to heat the edges, and after the edges are sufficiently heated, the plate placed between the contact edges will be removed to allow for welding of the edges. Preferably, the plate is engraved to have different depths to control the degree of the fabric softening or melting for different softening or melting proportions of the contact edges. This will bring about the benefit that different portions of the edges to be welded will have different degrees of hardness, for example, the heels should be sufficiently hard whereas the shoe uppers need to be softer. In the infrared welding method, tubular electric heating element, for example, may be used as the infrared heating source. By controlling the infrared intensity, the same effect of obtaining different degrees of welding hardness as in the hot plate welding method can be realized.

In the flame welding method, the same effect of obtaining different degrees of welding hardness can be realized by adjusting the distance between the flame and the contact edge to be welded.

Ultrasonic welding method as one of the known plastic welding methods is also possible for the invention.

The shoe halves can be welded together with the above methods of plastic welding and different degrees of welding hardness can be obtained. Among the plastic welding methods, the most preferable is the infrared welding method.

Hereinafter, embodiments of the invention will be described with reference to the drawings. FIGS. 1-8 illustrate an exemplary shoe constructed according to the process for making a shoe of the invention using a stand-alone mouldable non-woven fabric.

Figure 2:
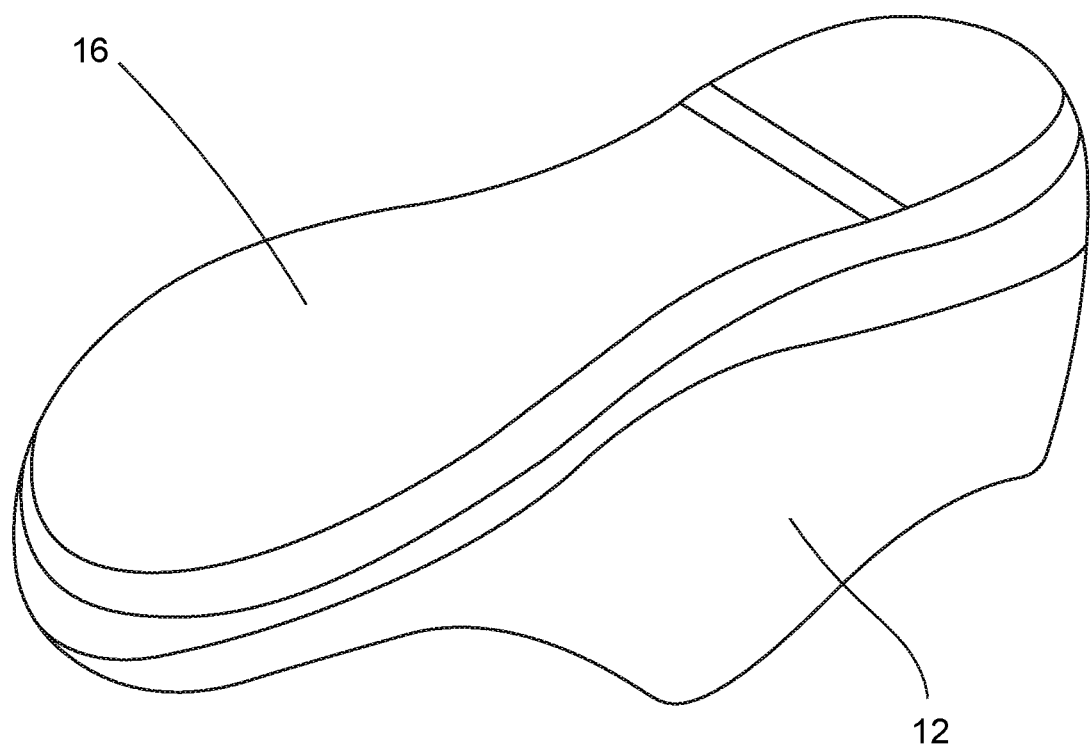
FIG. 2 is a perspective view from the bottom of the shoe of FIG. 1, illustrating the shoe upper and the midsole.

As illustrated in FIGS. 1 and 2, the shoe 10 or footwear article comprises a shoe upper 12, a midsole 14 and an outsole 16. In the depicted embodiment, the shoe 10 is a flat heel shoe.

With reference to FIGS. 3A, 3B, 4, 5 and 6, the mouldable non-woven needle punch felt fabric described in patent applications PCT/CN2011/071371 and PCT/CN2011/084323 is used to make two symmetrical upper halves 121, 122 separately, and the two upper halves 121, 122 are symmetrical longitudinally relative to each other. Specifically, the fabric is heated to become softened and put into two symmetrical moulds. Under the effect of compression moulding, the softened fabric would be moulded into two symmetrical upper halves 121, 122 of desirable shapes.

Figure 3A:
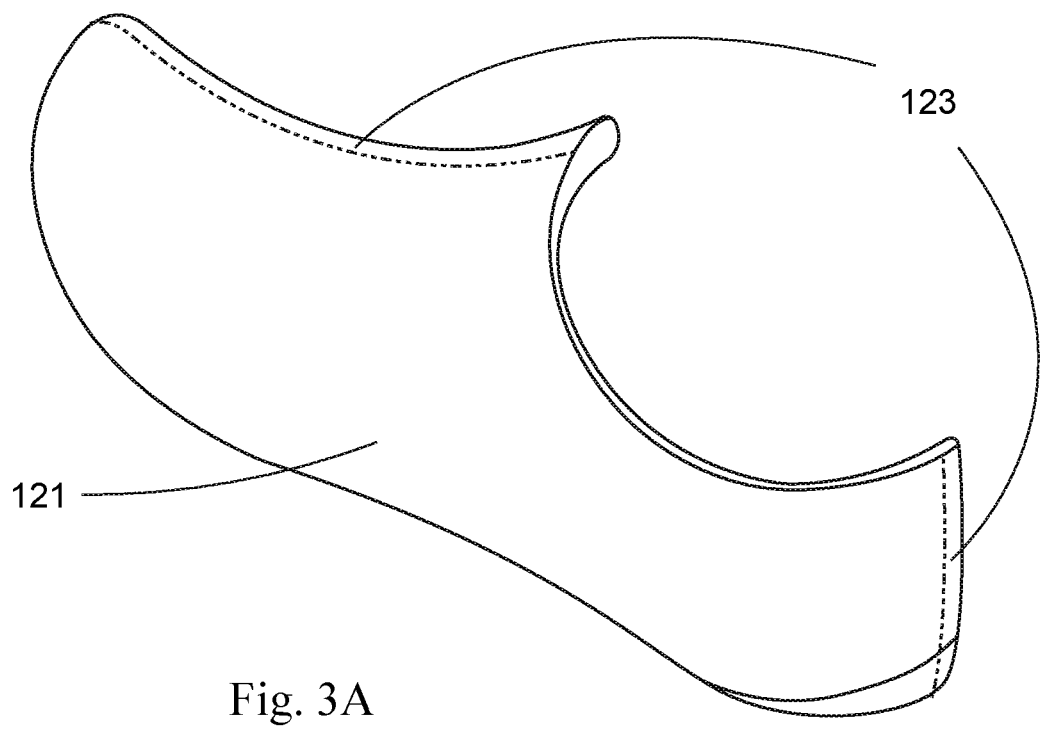
FIG. 3A and FIG. 3B are perspective views from the top of two symmetrical upper halves before welding to each other, illustrating marginal portions of the halves to be welded.
Figure 3B:
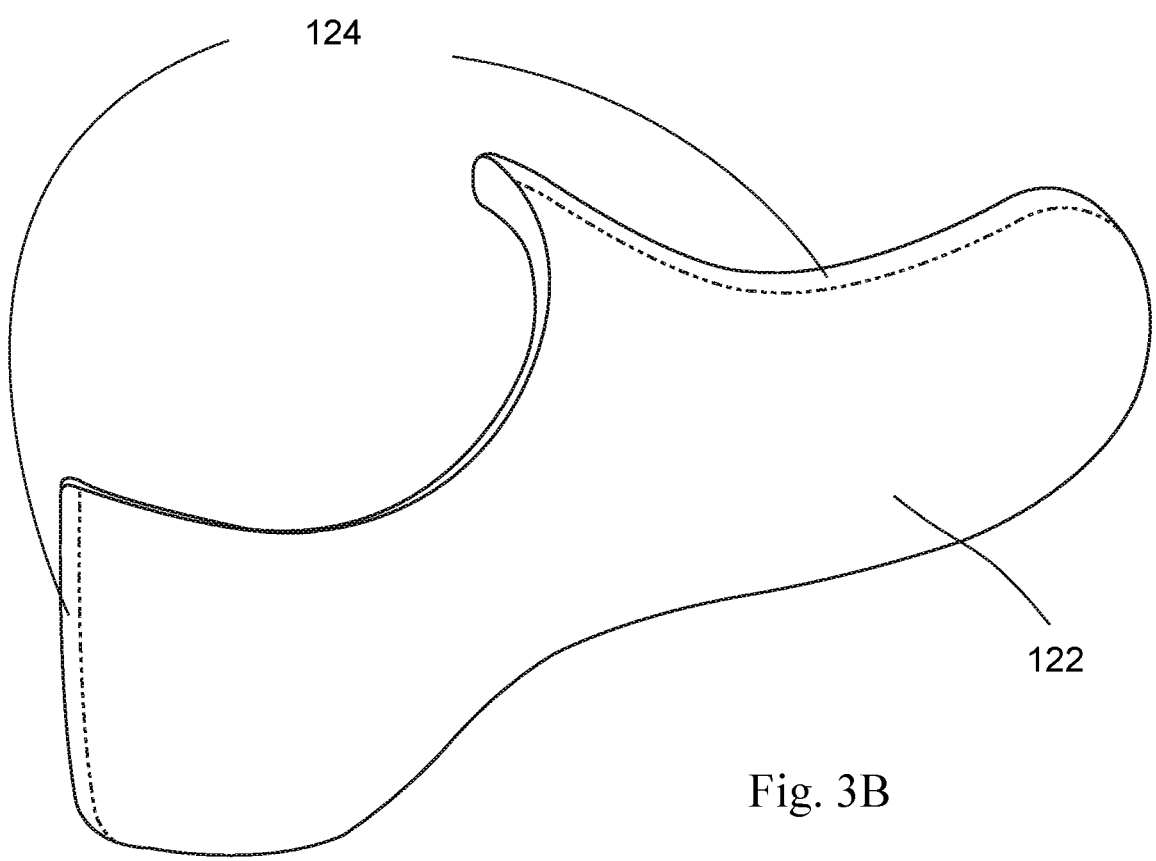
Figure 4:
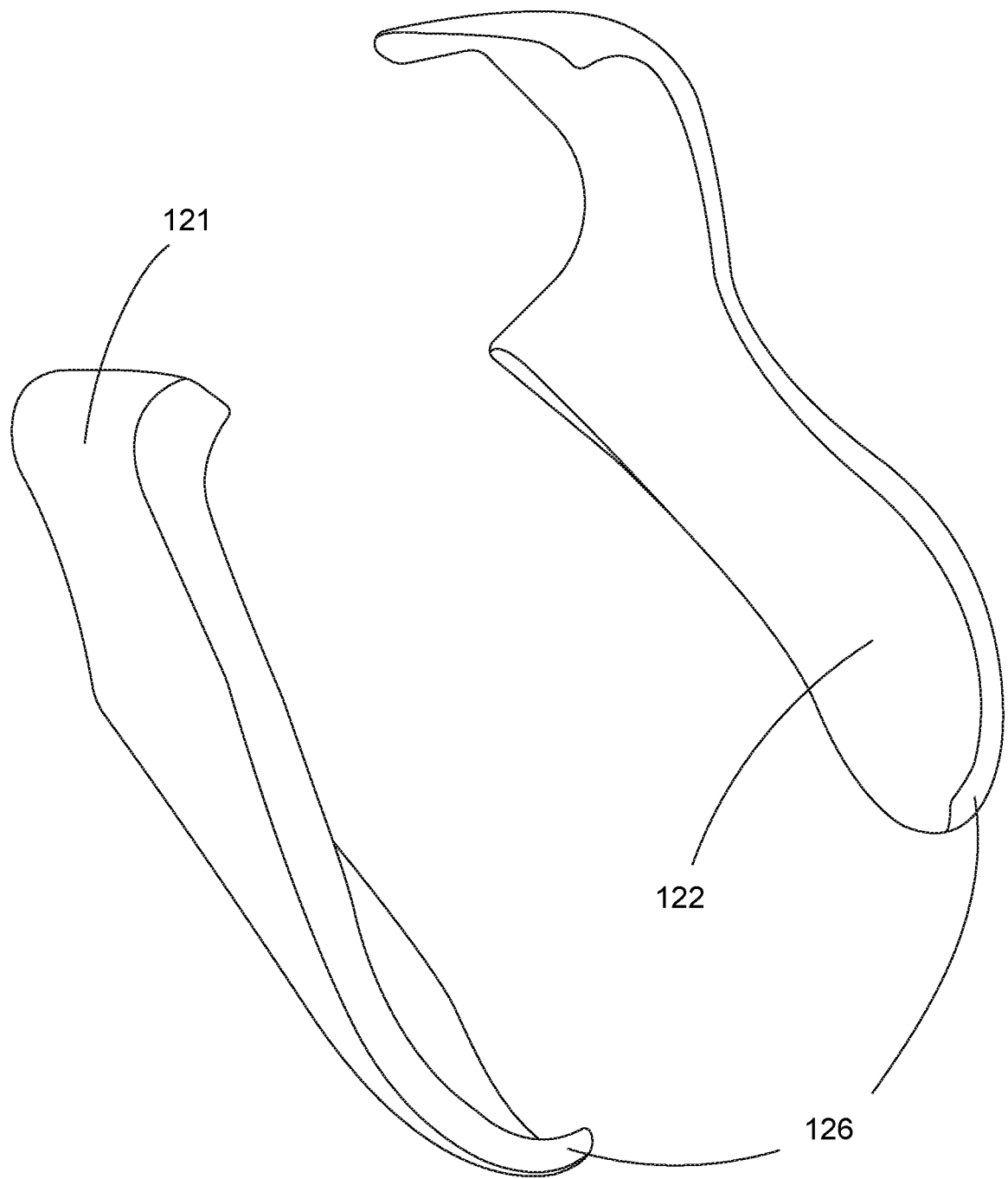
FIG. 4 and FIG. 5 are additional perspective views of the two symmetrical upper halves, illustrating the lower edge of each half.
Figure 5:
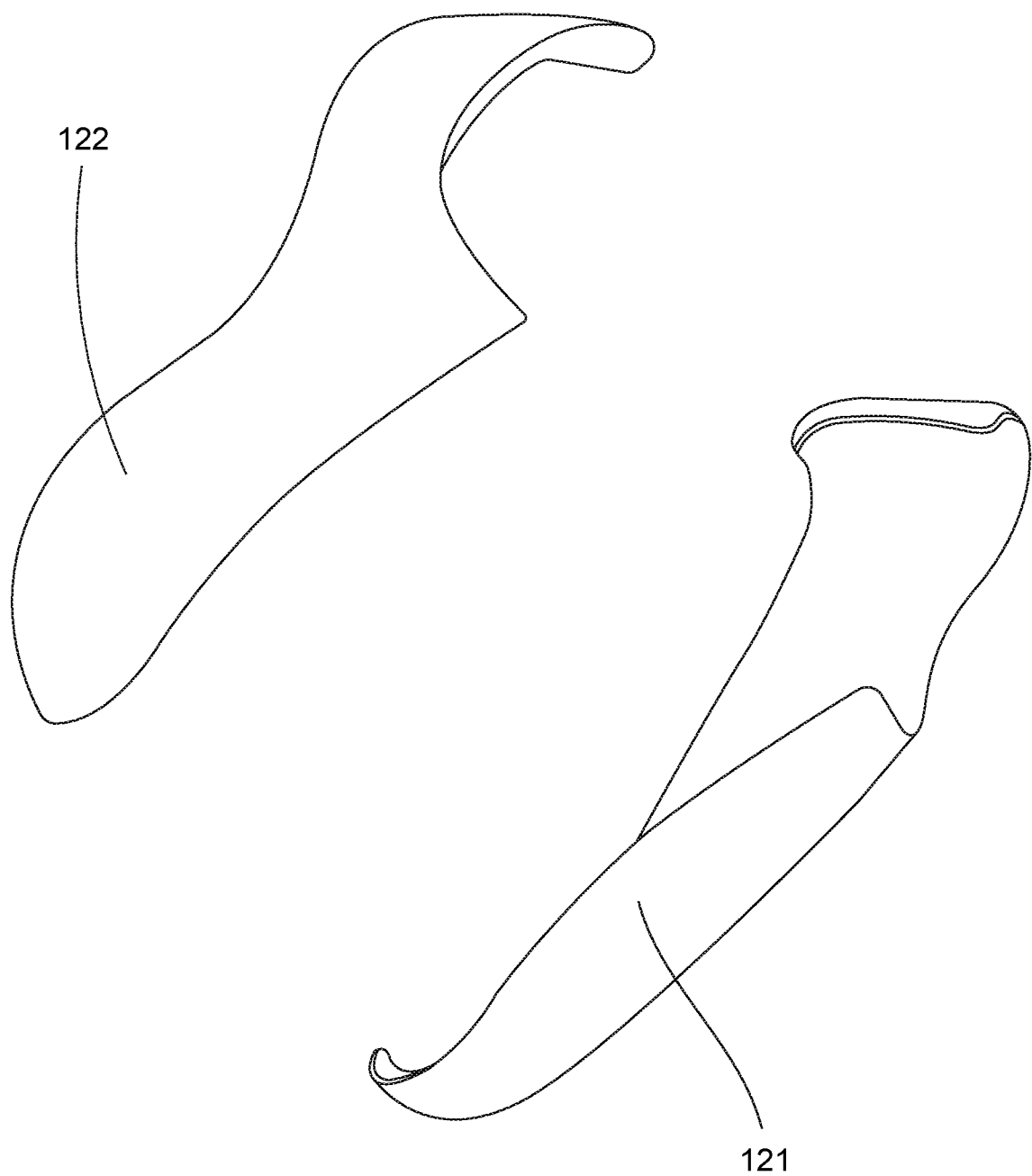
Figure 6:
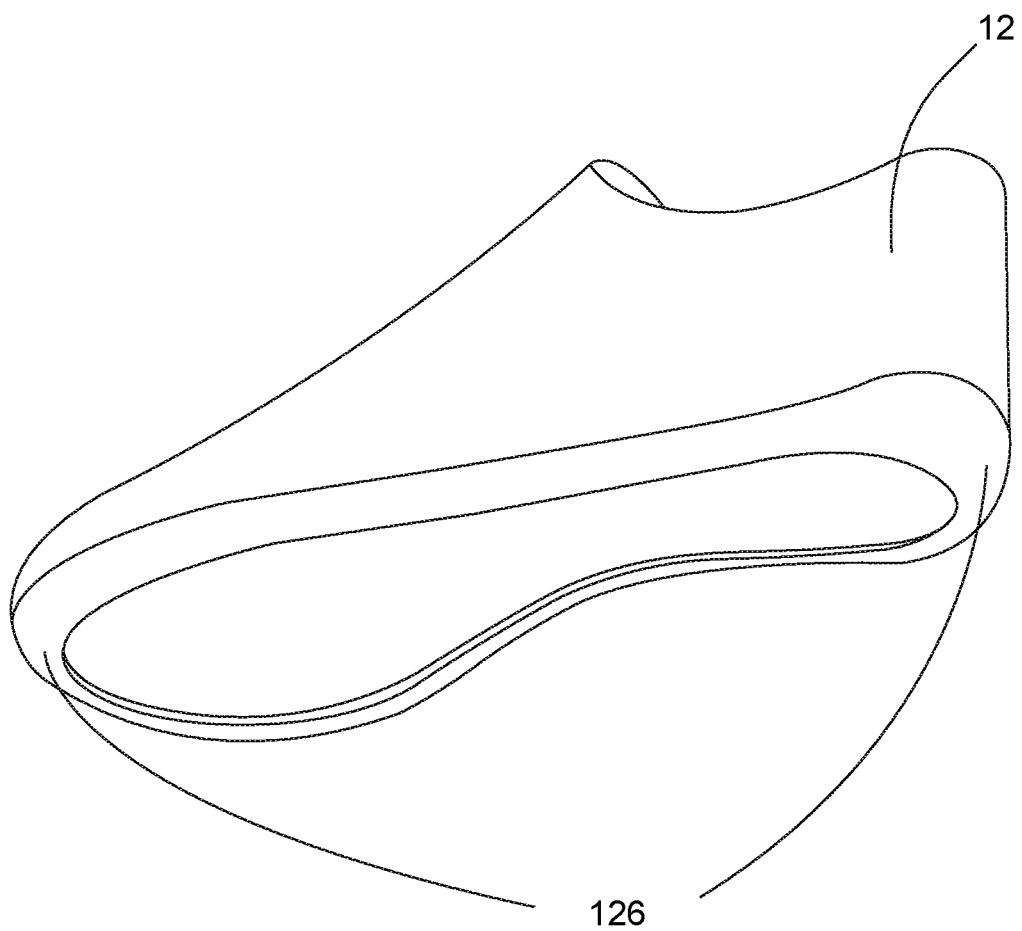
FIG. 6 is a perspective bottom view of the welded shoe upper, illustrating the lower edge of the shoe upper to be welded to the midsole.

The two upper halves 121, 122 would be joined to form a whole shoe upper by a plastic welding method. Specifically, upper halves 121, 122 are placed in a way that marginal portions 123 of the half 121 and the marginal portions 124 of the half 122 are opposite to each other and ready for being welded together. Generally, the marginal portions 123, 124 include the portions in the front and back of the shoe upper (as shown in FIGS. 3A and 3B) and a lower edge 126 of the shoe upper (as shown in FIG. 4) are to be treated, with the portions forming the opening provided on the shoe upper untreated. For example, hot air is applied to heat and soften or even melt the marginal portions 123, 124 to be jointed. The marginal portions 123, 124 of the halves are joined together and then cooled to form the shoe upper 12 (as shown in FIG. 6).

According to the invention, the two symmetrical moulded halves 121, 122 are first prepared separately to form the shoe upper 12, because the compression moulding adopted by the invention allows for moulding two halves only in light of the nature of softened nonwoven fabric. An injection-moulding is not possible for the nonwoven fabric used in the invention.

As mentioned above, the fabric used has excellent mouldablity, remarkable dimension stability and persistent shape maintenance after being moulded, thus the shoe upper 12 made from such fabric can be sized and shaped as desired and can be in any length, thickness and/or style as desired by the manufacturer or wearer.

Figure 7:
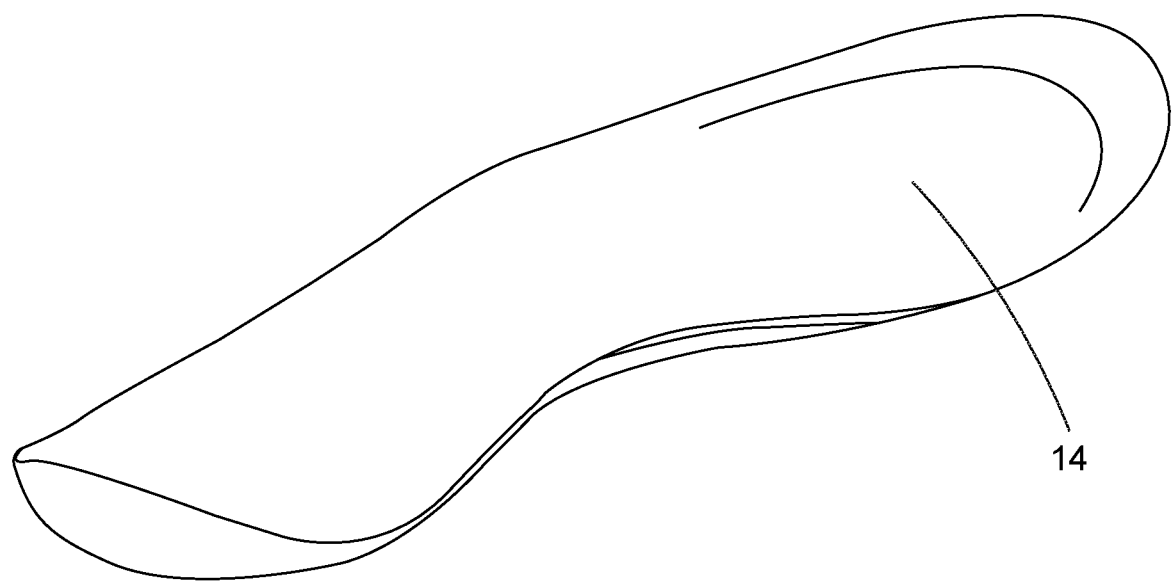
FIG. 7 is a perspective top view of the moulded midsole before welding to the shoe upper.
Figure 8:
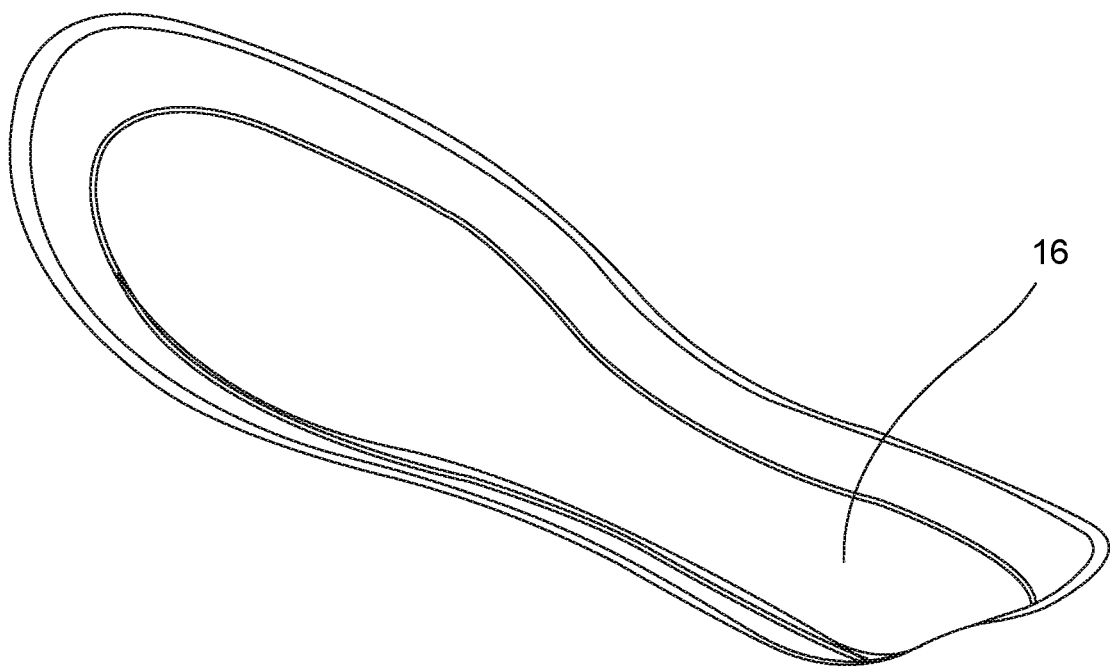
FIG. 8 is a perspective top view of the moulded outsole before welding to the midsole.

With reference to FIGS. 7 and 8, the midsole 14 and the outsole 16 are moulded respectively as one piece from the same fabric of the shoe upper 12. In other words, the fabric is heated to become softened and then moulded into the respective midsole 14 and outsole 16 of any shape and size as desired. The outsole 16 may be moulded with an optional heel (not shown) which is configured to contact the ground.

The stand-alone mouldable nonwoven fabric may be made from the same fibers but having different characteristics, such as gram weight, flexibility, rigidity, softness and the like. As such, a more rigid and hard nonwoven fabric may be used to mould the outsole 16 that is in direct contact with the ground, while a more flexible and soft nonwoven fabric may be used to mould the midsole 14 which sits directly beneath the foot or an insole to provide the flexibility and comfort.

The next step is to assemble the shoe upper 12 and the midsole 14 to form the structure of the shoe 10. To implement this assembly, the whole lower edge 126 of the shoe upper 12 and a whole surface of the midsole 14 in contact with each other would be heated, welded and joined together by the plastic welding method as discussed above. The whole surface attachment of the shoe upper 12 and the midsole 14 would be able to enhance the attachment of such two shoe parts.

Following the attachment of the shoe upper 12 and the midsole 14, the whole surface of the midsole 14 and the whole surface of the outsole 16 would be heated and welded together by the plastic welding method. After the attachment of the midsole 14 and the outsole 16, the shoe upper, the midsole and the outsole are welded together and the whole structure of the shoe is formed.

An insole (not shown) may be moulded as a prefabricated part using the same method of making the above-mentioned shoe parts from the same stand-alone non-woven felt fabric. The insole may be removably attached to the shoe upper. As an alternative, the insole may be heated and welded onto the shoe upper in a manner similar to the procedure of assembling the shoe upper 12 and the midsole 14. If desirable, extra insoles and midsoles are moulded from a mouldable nonwoven fabric which has a small density and are added for comfort, health or other reasons, such as to control the shape, moisture, or smell of the shoe.

Therefore, the process of the invention allows to make a shoe 10 in which all of the shoe parts are moulded by a compression moulding process as moulded parts, and the moulded parts are then joined together by a so-called "plastic welding method". The process for making a shoe according to the invention not only completely eliminates the need of using any glue or adhesive, but also simplifies the operation of making the shoe. Eliminating the step of gluing in the process thoroughly solves the problems associated with the health hazards for the operators and the disposal of the shoe for the environment, which are caused by the harmful adhesives (i.e. increasing the eco-friendliness).

Moreover, the shoe 10 is aesthetically equivalent to one made by gluing, although it is obtained according to the process of the invention which is totally automated, quick and inexpensive and with a small number of steps.

A further advantage of the process according to the invention is that all of the shoe parts are made from a same material and therefore can be recycled easily for re-use.

By making use of the advantages of the stand-alone nonwoven fabric including high rigidity and hardness, mouldability and shape maintenance, the shoe parts, which are moulded from such a fabric, permit to retain their shapes while providing sufficient compressive strength. In the meantime, making and assembling the shoe parts would be less labor-intensive, reduce production time and save operation costs.

Alternatively, in order to utilize the novel process for making a shoe according to the invention while maintain the appearance of a conventional shoe upper, the shoe upper can be made in part or in full with conventional stitchable materials. In the case that the shoe upper is solely made of stitchable materials, the lower edge of the shoe upper is stitched to the midsole made of the mouldable non-woven fabric, then welded to the outsole according to the process of the invention. In the case that only the upper body of the shoe upper is made of stitchable materials, the upper body is stitched to a lower edge made of the mouldable non-woven fabric for welding to the midsole. The lower edge can be moulded from the stand-alone mouldable nonwoven fabric in one piece. The lower edge can also be moulded as two separate symmetrical halves and welded to each other at marginal portions. There is no restriction to the portion of the shoe upper that is made of stitchable materials; it can form any desirable portion of the shoe upper as required by the manufacturer or the wearer.

It is understood that the present invention is not limited to the above embodiments and any appropriate modifications can be adopted within the scope of the present invention as long as they can achieve the present invention.

What is claimed is:

1. A process for making a shoe including a shoe upper, a midsole, and an outsole, the shoe upper comprising an upper body having an opening configured to receive a wearer's foot, and a lower edge extending perimetrically from the upper body, the process comprising steps of:
   i) providing separately the shoe upper, the midsole, and the outsole, wherein the shoe upper is made from a standalone mouldable nonwoven fabric, the midsole and the outsole are respectively moulded from the stand-alone mouldable nonwoven fabric, and the stand-alone mouldable nonwoven fabric has the ability of self-sustaining and shape maintenance and is heated to become softened until molten;
   ii) attaching the lower edge of the shoe upper to the midsole; and
   iii) heating at least a part of the midsole and at least a part of the outsole for welding said heated parts of the midsole and the outsole so as to attach the midsole to the outsole, wherein different degrees of welding hardness are obtained through nonuniform welding at different welding sections of said heated parts,
   wherein the shoe upper is provided by moulding two separate symmetrical halves as one piece from the stand-alone mouldable nonwoven fabric, respectively; heating the two symmetrical moulded halves at their respective marginal portions along a longitudinal direction of the shoe upper to an extent that allows for welding said heated marginal portions of the two halves so as to attach the two halves at the marginal portions thereof in a manner that the two symmetrical halves form together the shoe upper.

2. The process of claim 1, wherein the lower edge of the shoe upper and the midsole are heated and welded so that they are attached to each other.

3. The process of claim 1, wherein the midsole and the outsole are heated and welded over their entire surfaces in step iii).

4. The process of claim 1, further comprising the step of moulding an insole as one piece from the stand-alone mouldable nonwoven fabric, the insole being provided fixedly or removably in the shoe upper.

5. The process of claim 4, wherein the insole and the midsole are heated and welded together.

6. The process of claim 1, wherein the moulding of the two separate symmetrical halves is carried out in a compression moulding process.

7. The process of claim 1, wherein the welding comprises plastic welding.

\* \* \* \* \*